United States Patent [19]

Körfgen

[11] Patent Number: 5,152,498
[45] Date of Patent: Oct. 6, 1992

[54] VALVE HANDLE WITH OVERLOAD PROTECTION

[75] Inventor: Harald Körfgen, Fröndenberg, Fed. Rep. of Germany

[73] Assignee: Friedrich Grohe Aktiengesellschaft, Hemer, Fed. Rep. of Germany

[21] Appl. No.: 830,074

[22] Filed: Jan. 31, 1992

[30] Foreign Application Priority Data

Feb. 15, 1991 [DE] Fed. Rep. of Germany ....... 4104656

[51] Int. Cl.⁵ ............................................. F16K 31/44
[52] U.S. Cl. .................................. 251/81; 251/79;904
[58] Field of Search ........................ 251/79, 80, 81, 904

[56] References Cited

U.S. PATENT DOCUMENTS

| 2,608,377 | 8/1952 | Streun | 251/81 |
| 3,827,670 | 8/1974 | Saarem | 251/81 |
| 3,910,308 | 10/1975 | Mack | 251/81 |

FOREIGN PATENT DOCUMENTS 1038855  9/1958  Fed. Rep. of Germany ........ 251/79
2322153  1/1974  Fed. Rep. of Germany .

Primary Examiner—A. Michael Chambers
Attorney, Agent, or Firm—Herbert Dubno; Andrew M. Wilford

[57] ABSTRACT

A valve has a housing, a valve spindle projecting outward from the housing and centered on and rotatable about an axis, and an actuating handle. Radially inwardly projecting and axially extending ridges are formed in the handle. An overload protecting coupling is formed by a sleeve fitted over the spindle and formed unitarily with a skirt having an inner surface spaced radially outward from the spindle and an outer surface formed with radially outwardly projecting and axially extending ridges meshing with the ridges of the handle. The skirt is formed with a plurality of axially inwardly open slots subdividing it into a plurality of ridged segments and it is elastically inwardly deflectable. Thus this sleeve forms a slip coupling that allows the handle to rotate the valve spindle until same is arrested, for instance at the end of its stroke, and thereafter turn independently of the spindle to prevent overloading it.

9 Claims, 2 Drawing Sheets

5,152,498

VALVE HANDLE WITH OVERLOAD PROTECTION

FIELD OF THE INVENTION

The present invention relates to a fluid-control valve. More particularly this invention concerns a handle assembly for such a valve which is provided with a system for protecting the valve mechanism against overstressing or loading the valve handle.

BACKGROUND OF THE INVENTION

In some applications it is necessary to protect a faucet or control valve against excessive twisting of the actuating knob or handle. For instance, the faucets at a scrub sink for an operating theater are normally equipped with long handles that can be operated by an elbow or knee. On the one hand the long lever arm afforded by such a structure makes it possible to exert considerable torque on the valve mechanism, and on the other hand a person using an elbow or knee to actuate a mechanism is not able to gauge force accurately.

Thus as described in German patent 2,322,153 of R. Killias it is known to provide a clutch between the handle and the valve spindle. This clutch has a pair of elements pressed axially together by a spring so that the clutch can slip when the valve spindle stops and excessive torque is still being exerted on the handle.

Such an arrangement is relatively effective at protecting the valve, but is fairly complex and bulky. Furthermore it adds considerably to the cost of the valve.

OBJECTS OF THE INVENTION

It is therefore an object of the present invention to provide an improved overload protector for a valve. Another object is the provision of such an improved overload protector for a valve which overcomes the above-given disadvantages, that is which is relatively simple, compact, and cheap to manufacture.

SUMMARY OF THE INVENTION

The instant invention is used in a valve having a housing, a valve spindle projecting outward from the housing and centered on and rotatable about an axis, and an actuating handle. It is an overload protector having radially inwardly projecting and axially extending ridges formed in the handle and a sleeve fitted over the spindle and formed unitarily with a skirt having an inner surface spaced radially outward from the spindle and an outer surface formed with radially outwardly projecting and axially extending ridges meshing with the ridges of the handle. The skirt is formed with a plurality of axially inwardly open slot subdividing it into a plurality of ridged segments and it is elastically inwardly deflectable.

Thus this simple sleeve forms a slip coupling that allows the handle to rotate the valve spindle until same is arrested, for instance at the end of its stroke, and further pressure on the handle will not strip the valve but instead will take place with the handle slipping on the spindle. In this manner the valve is protected against overloading.

According to the invention the ridges each have a pair of planar flanks each bisected by a respective plane extending radially through the axis with each flank forming an acute angle with the respective plane. More particularly the outer surface is formed with teeth forming the ridges and the flanks of each ridge extend at an angle of about 90 to each other and at an angle of about 45° to the respective planes.

The sleeve itself is in accordance with this invention formed unitarily of a heat-insulating material. The handle and sleeve are formed offset from the ridges with complementary snap formations that couple them together axially but not rotationally. The slots are generally angularly equispaced about the axis and the outer surface is generally cylindrical.

It is also possible for the sleeve to have an angularly continuous and uninterrupted tubular inner part fixed rotationally to the spindle, a tubular outer part forming the outer surface, formed with and angularly subdivided by the slots, and formed with the ridges, and a connecting web radially interconnecting the inner and outer parts. Furthermore to prevent the segments from catching in the handle each segment has a central section formed with the ridges pair of unridged lands angularly flank the respective central section and bounding the respective slots.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
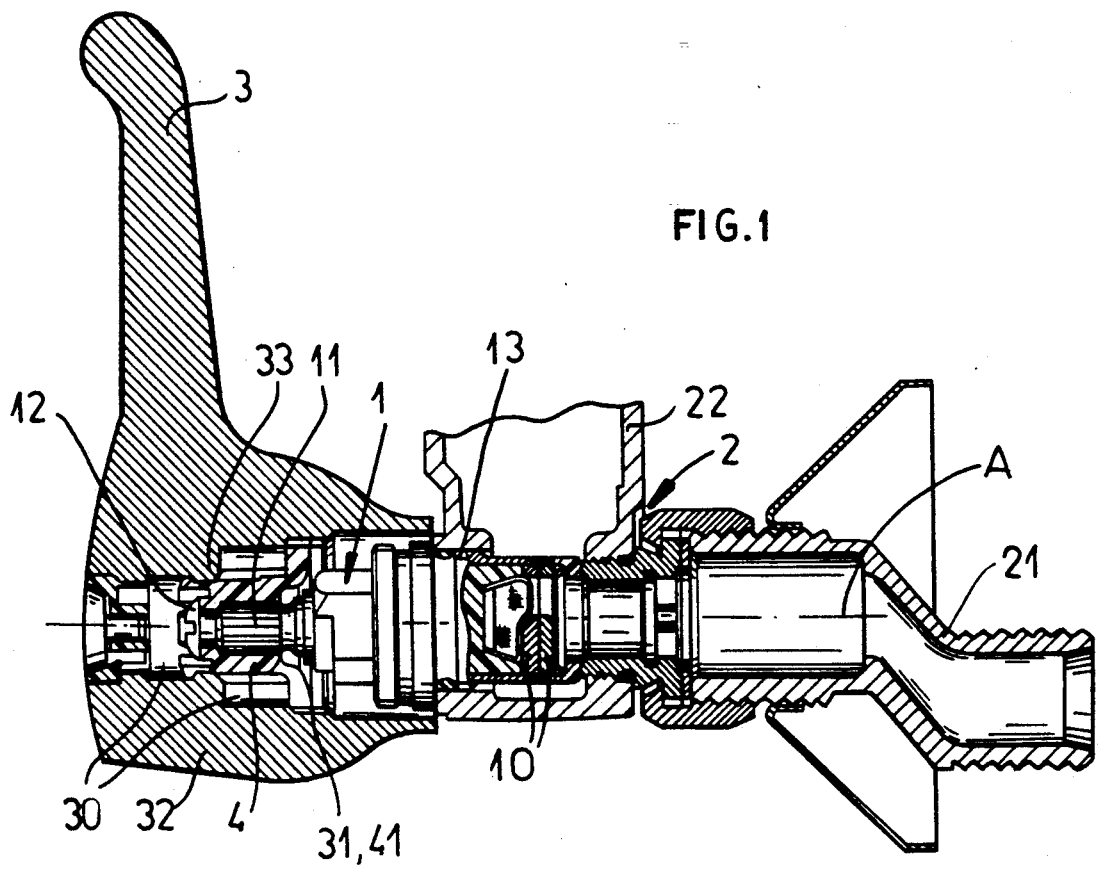
FIG. 1 is an axial section through a valve assembly according to the invention.
Figure 3:
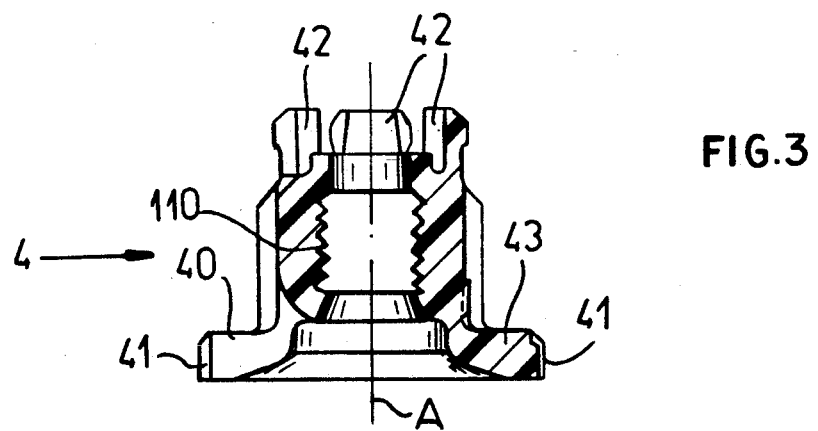
FIG. 3 is a section taken along line III—III of FIG. 2.
Figure 2:
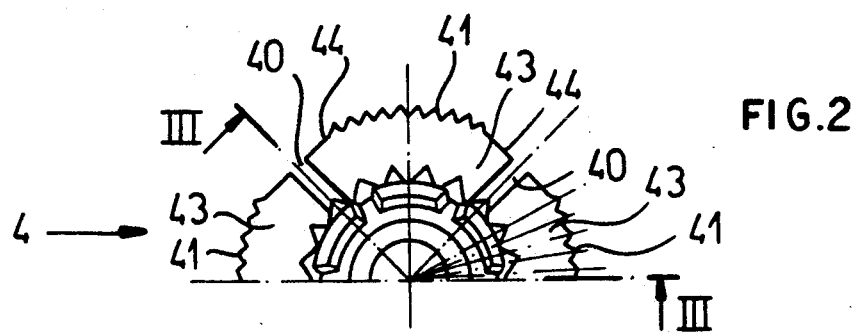
FIG. 2 is an end view of a portion of the coupling sleeve of FIG. 1.

As seen in FIGS. 1 through 3 a valve 1 according to the invention has a valve stem 11 centered on and rotatable in a housing 2 about an axis A and acting on one of two ceramic valve plates 10 to vary flow from an input pipe 21 to an output pipe 22. A sleeve 13 threaded into the housing 2 retains the plates 10 in place. Normally there are two such assemblies, one for hot water and one for cold, connected to a common faucet.

A radially projecting handle 3 is formed with a stepped bore 30 centered on the axis A and having a large-diameter inner portion formed with axially extending and radially inwardly projecting triangular-section ridges 31. The stem 11 has an outer end joined at ridges 110 with the inner surface of a coupling sleeve 4 shown in better detail in FIGS. 2 and 3. A screw 12 inserted through the small-diameter end of the bore 30 locks this sleeve 4 fixedly on the stem 11.

This sleeve 4 has a radially outwardly projecting skirt 43 formed with radially outwardly projecting and axially extending ridges 41 that mate with complementar inwardly projecting ridges 31 formed in the large-diameter portion of the bore 30. The skirt 43 is subdivided into four identical 90° segments by radially outward and axially inwardly open slots 40. The ridges 41 are located in each segment in a central region flanked by a pair of ridgeless lands 44 that facilitate radial engagement and disengagement of the ridges 41 and 31. The outer end of the sleeve 4 is formed with four axially outwardly projecting snap-coupling fingers 42 that have enlarged outer ends that snap outwardly past an annular radially inwardly projecting ridge 33 formed at the inner end of the small-diameter portion of the bore 30. Thus the formations 33 and 42 axially couple the handle 3 to the sleeve 4 while the ridges 31 and 41 rotationally couple them to each other.

With this system the ridges 41 are of triangular shape with flanks that extend at 90° to each other and that flank respective radial planes extending through an outer edge of each ridge. In addition the sleeve 4 is made of an elastically deformable synthetic resin such that it deforms when the spindle 11 is blocked against rotation and a torque in excess of 400Ncm to 700Ncm is exerted on the handle 3 with the spindle 11 arrested. Thus once the valve 1 comes to the full-open or full-closed position further pushing of the lever 3 will merely move it around on the stem 11 as the segments of the skirt 43 are cammed inward and the ridges 31 slip on the ridges 41.

Figure 4:
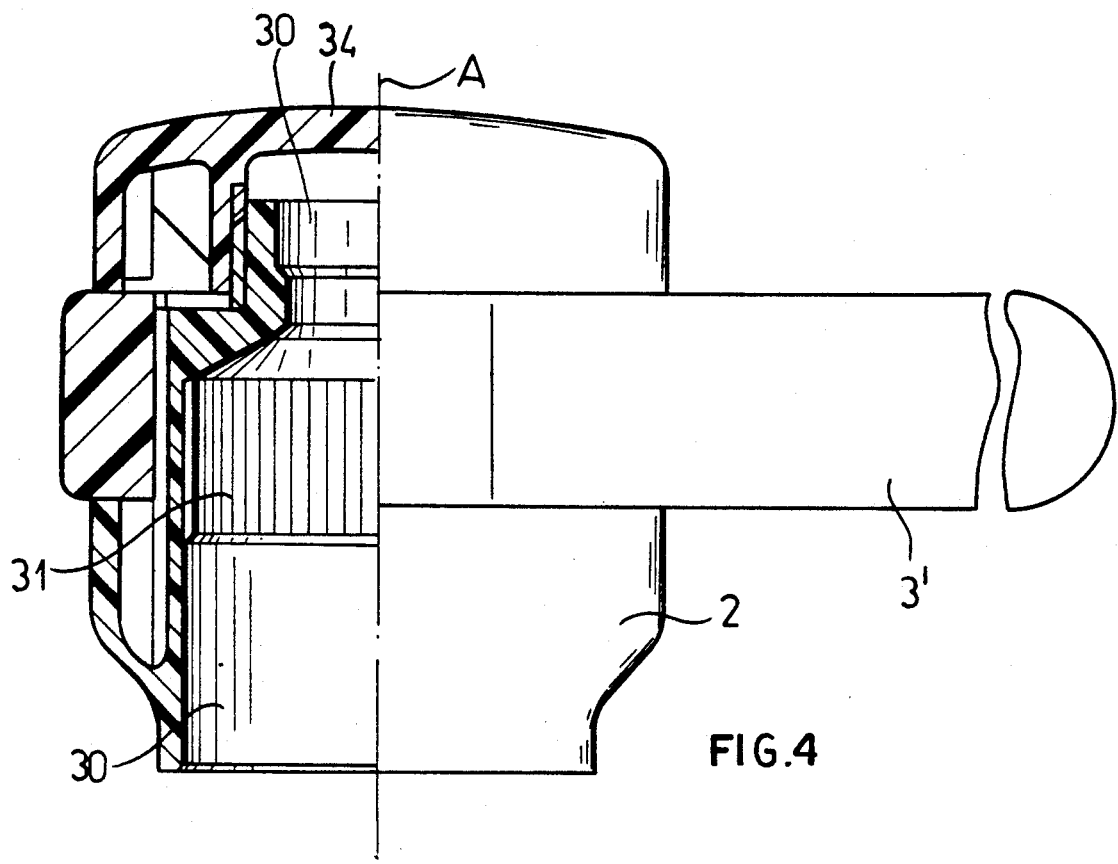
FIG. 4 is a side view partly in axial section through a handle in accordance with this invention.
Figure 6:
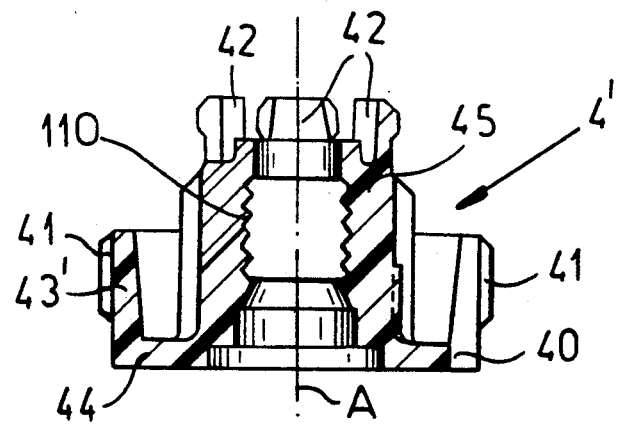
FIG. 6 is a section taken along line VI—VI of FIG. 5.
Figure 5:
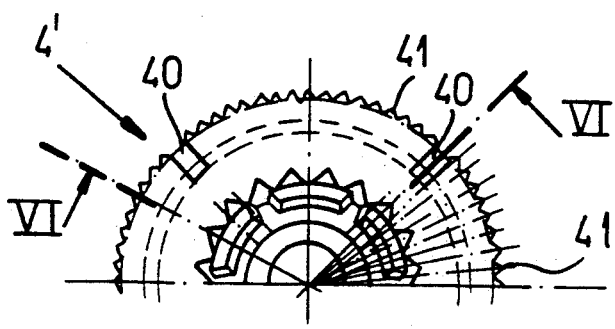
FIG. 5 is an end view of a coupling sleeve for the handle of FIG. 4.
Figure 3:
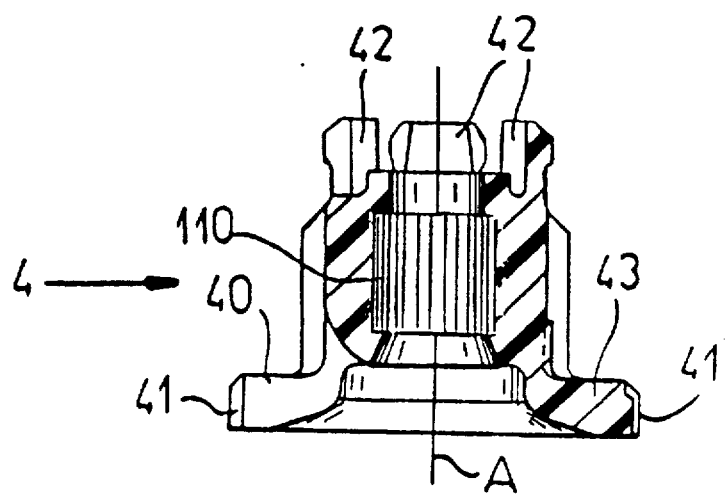
Figure 6:
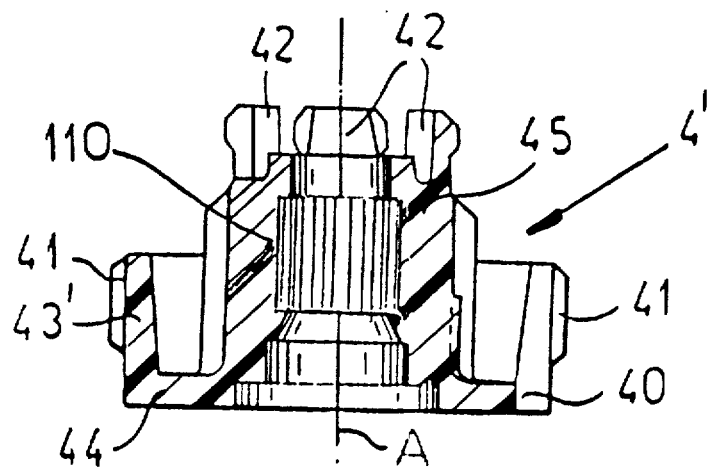

In the arrangement of FIGS. 4 through 6 a handle 3' is fitted on a hub 32 and held in place thereon by a screw-on cap 34. The hub 32 is formed internally with the ridges 31. Here a sleeve 4' is basically of U-section, having an internal cylindrically tubular part 45 formed with the snap formations 42, an outer generally cylindrically tubular skirt 43' formed with the ridges 41 and the slots 40, and a radially extending annular bight web 44 interconnecting the inner and outer parts 45 and 43'. This system operates identically to that of FIGS. 1 through 3.

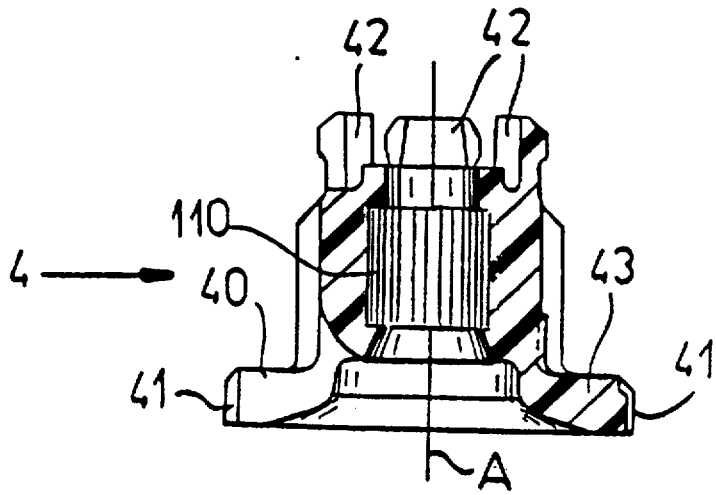

I claim:

1. In combination with a valve having
   a housing,
   a valve spindle projecting outward from the housing and centered on and rotatable about an axis, and
   an actuating handle, an overload protector comprising:
   radially inwardly projecting and axially extending ridges formed in the handle; and
   a sleeve fitted over the spindle and formed unitarily with a skirt having an inner surface spaced radially outward from the spindle and an outer surface formed with radially outwardly projecting and axially extending ridges meshing with the ridges of the handle, the skirt being formed with a plurality of axially inwardly open slots subdividing it into a plurality of ridged segments, the skirt being elastically inwardly deflectable.

2. The valve overload protector defined in claim 1 wherein the ridges each have a pair of flanks each bisected by a respective plane extending radially through the axis with each flank forming an acute angle with the respective plane.

3. The valve overload protector defined in claim 2 wherein the outer surface is formed with teeth forming the ridges, the flanks of each ridge extending at an angle of about 90° to each other and at an angle of about 45° to the respective planes.

4. The valve overload protector defined in claim 1 wherein the sleeve is formed of a heat-insulating material.

5. The valve overload protector defined in claim 1 wherein the handle and sleeve are formed offset from the ridges with complementary snap formations that couple them together axially but not rotationally.

6. The valve overload protector defined in claim 1 wherein the slots are generally angularly equispaced about the axis.

7. The valve overload protector defined in claim 1 wherein the outer surface is generally cylindrical.

8. The valve overload protector defined in claim 1 wherein the sleeve has
   an angularly continuous and uninterrupted tubular inner part fixed rotationally to the spindle,
   a tubular outer part forming the outer surface, formed with and angularly subdivided by the slots, and formed with the ridges, and
   a connecting web radially interconnecting the inner and outer parts.

9. The valve overload protector defined in claim 1 wherein each segment has a central section formed with the ridges and a pair of unridged lands angularly flank the respective central section and bounding the respective slots.

* * * * *

UNITED STATES PATENT AND TRADEMARK OFFICE
CERTIFICATE OF CORRECTION

PATENT NO. : 5,152,498

DATED : October 6, 1992

INVENTOR(S) : Harald Korfgen

It is certified that error appears in the above-identified patent and that said Letters Patent is hereby corrected as shown below:

The title page, showing an illustrative figure, should be deleted and substitute therefor the attached title page.

Figs. 3 and 6 should be deleted to be replaced with Figs. 3 and 6 as shown on the attached sheet.

Signed and Sealed this

Eighth Day of November, 1994

*Attest:*

BRUCE LEHMAN

*Attesting Officer*      Commissioner of Patents and Trademarks

United States Patent [19]

Körfgen

[11] Patent Number: 5,152,498

[45] Date of Patent: Oct. 6, 1992

[54] VALVE HANDLE WITH OVERLOAD PROTECTION

[75] Inventor: Harald Körfgen, Fröndenberg, Fed. Rep. of Germany

[73] Assignee: Friedrich Grohe Aktiengesellschaft, Hemer, Fed. Rep. of Germany

[21] Appl. No.: 830,074

[22] Filed: Jan. 31, 1992

[30] Foreign Application Priority Data

Feb. 15, 1991 [DE] Fed. Rep. of Germany ....... 4104656

[51] Int. Cl.⁵ .................................. F16K 31/44
[52] U.S. Cl. ........................... 251/81; 251/79;904
[58] Field of Search .................. 251/79, 80, 81, 904

[56] References Cited

U.S. PATENT DOCUMENTS

| | | | |
|---|---|---|---|
| 2,608,377 | 8/1952 | Streun | 251/81 |
| 3,827,670 | 8/1974 | Saarem | 251/81 |
| 3,910,308 | 10/1975 | Mack | 251/81 |

FOREIGN PATENT DOCUMENTS

| | | | |
|---|---|---|---|
| 1038855 | 9/1958 | Fed. Rep. of Germany | 251/79 |
| 2322153 | 1/1974 | Fed. Rep. of Germany | |

Primary Examiner—A. Michael Chambers
Attorney, Agent, or Firm—Herbert Dubno; Andrew M. Wilford

[57] ABSTRACT

A valve has a housing, a valve spindle projecting outward from the housing and centered on and rotatable about an axis, and an actuating handle. Radially inwardly projecting and axially extending ridges are formed in the handle. An overload protecting coupling is formed by a sleeve fitted over the spindle and formed unitarily with a skirt having an inner surface spaced radially outward from the spindle and an outer surface formed with radially outwardly projecting and axially extending ridges meshing with the ridges of the handle. The skirt is formed with a plurality of axially inwardly open slots subdividing it into a plurality of ridged segments and it is elastically inwardly deflectable. Thus this sleeve forms a slip coupling that allows the handle to rotate the valve spindle until same is arrested, for instance at the end of its stroke, and thereafter turn independently of the spindle to prevent overloading it.

9 Claims, 2 Drawing Sheets